United States Patent
Singh

(10) Patent No.: US 12,261,954 B2
(45) Date of Patent: Mar. 25, 2025

(54) SYSTEM AND METHOD TO VALIDATE A RENDERED OBJECT USING NON-FUNGIBLE TOKENS

(71) Applicant: Bank of America Corporation, Charlotte, NC (US)

(72) Inventor: Shailendra Singh, Thane West (IN)

(73) Assignee: Bank of America Corporation, Charlotte, NC (US)

( * ) Notice: Subject to any disclaimer, the term of this patent is extended or adjusted under 35 U.S.C. 154(b) by 262 days.

(21) Appl. No.: 17/751,362

(22) Filed: May 23, 2022

(65) Prior Publication Data

US 2023/0379159 A1    Nov. 23, 2023

(51) Int. Cl.
*H04L 9/32* (2006.01)
*H04L 9/00* (2022.01)

(52) U.S. Cl.
CPC .............. *H04L 9/3213* (2013.01); *H04L 9/50* (2022.05)

(58) Field of Classification Search
CPC ................................. H04L 9/50; H04L 9/3213
See application file for complete search history.

(56) References Cited

U.S. PATENT DOCUMENTS

| | | | |
|---|---|---|---|
| 1,069,208 A | 8/1913 | Walker | |
| 8,583,915 B1 | 11/2013 | Huang | |
| 10,505,726 B1 * | 12/2019 | Andon | G06Q 30/0185 |
| 10,722,802 B2 | 7/2020 | Hingorani | |
| 10,967,255 B2 | 4/2021 | Rosado | |
| 10,999,317 B2 | 5/2021 | Kozloski et al. | |
| 11,249,714 B2 | 2/2022 | Spivack et al. | |
| 11,295,318 B2 | 4/2022 | Andon et al. | |
| 11,301,460 B2 * | 4/2022 | Rich | H04L 67/104 |
| 11,308,184 B2 | 4/2022 | Andon et al. | |
| 11,860,981 B2 * | 1/2024 | Yallen | G06V 40/172 |
| 2019/0035209 A1 * | 1/2019 | Simons | G07F 17/32 |
| 2019/0158289 A1 | 5/2019 | Drouin et al. | |
| 2019/0299105 A1 | 10/2019 | Knight et al. | |
| 2019/0325498 A1 | 10/2019 | Clark | |
| 2020/0005284 A1 | 1/2020 | Vijayan | |

(Continued)

OTHER PUBLICATIONS

M. Xu et al., "A Full Dive Into Realizing the Edge-Enabled Metaverse: Visions, Enabling Technologies, and Challenges," in IEEE Communications Surveys & Tutorials, vol. 25, No. 1, pp. 656-700, Firstquarter 2023. (Year: 2023).*

(Continued)

*Primary Examiner* — Kari L Schmidt

(57) ABSTRACT

An apparatus for validating a rendered object using non-fungible tokens comprises a processor associated with a server. The processor is configured to determine one or more parameters associated with a rendered object in a virtual environment, wherein the rendered object is a visual display operable for engagement in an interaction within the virtual environment. The processor is further configured to generate a non-fungible token (NFT) for assignment to the rendered object and to receive a request to establish an interaction session to conduct an interaction between a first avatar associated with a first user and the rendered object. The processor is further configured to receive a request to validate the generated NFT and to conduct the interaction between the first avatar and the rendered object in response to validating the generated NFT.

20 Claims, 4 Drawing Sheets

(56) References Cited

U.S. PATENT DOCUMENTS

| | | | |
|---|---|---|---|
| 2020/0294097 A1 | 9/2020 | Spivack et al. | |
| 2020/0320825 A1 | 10/2020 | Simons | |
| 2020/0366671 A1 | 11/2020 | Larson et al. | |
| 2021/0248653 A1* | 8/2021 | McKenzie | H04L 9/3247 |
| 2021/0252407 A1 | 8/2021 | Witchey et al. | |
| 2022/0139198 A1 | 5/2022 | Frascati-Robinson et al. | |
| 2022/0141271 A1 | 5/2022 | Jamison et al. | |
| 2022/0141932 A1 | 5/2022 | Beaumier et al. | |
| 2022/0351279 A1* | 11/2022 | Cardenas Gasca | H04L 51/10 |
| 2022/0351280 A1* | 11/2022 | Cardenas Gasca | G06Q 20/363 |
| 2022/0366061 A1* | 11/2022 | Spivack | H04L 9/3271 |
| 2023/0009304 A1* | 1/2023 | Jakobsson | G06Q 30/0241 |
| 2023/0182025 A1* | 6/2023 | Benedetto | G06Q 20/0655 |
| | | | 463/42 |
| 2023/0237483 A1* | 7/2023 | Gagne-Keats | G06Q 20/4014 |
| | | | 705/66 |
| 2023/0237499 A1* | 7/2023 | Padmanabhan | G06Q 30/01 |
| | | | 705/304 |
| 2023/0266930 A1* | 8/2023 | Baker | H04L 63/10 |
| | | | 358/1.14 |
| 2023/0360006 A1* | 11/2023 | Patel | G06Q 30/0643 |
| 2023/0360044 A1* | 11/2023 | Patel | G06Q 20/4016 |
| 2023/0360045 A1* | 11/2023 | Assenov | A63F 13/792 |
| 2024/0020354 A1* | 1/2024 | Benedetto | G06Q 30/06 |
| 2024/0064019 A1* | 2/2024 | Gagne-Keats | H04L 9/0825 |
| 2024/0211909 A1* | 6/2024 | Lal | G06N 20/00 |

OTHER PUBLICATIONS

Ghirmai, Siem, et al. "Self-sovereign identity for trust and interoperability in the metaverse." 2022 (SmartWorld/UIC/ScalCom/DigitalTwin/PriComp/Meta) Dec. 1, 20225 (pp. 2468-2475). (Year: 2022).*

B. Guidi and A. Michienzi, "Social games and Blockchain: exploring the Metaverse of Decentraland," 2022 IEEE 42nd International Conference on Distributed Computing Systems Workshops (ICDCSW), Bologna, Italy, 2022, pp. 199-204. (Year: 2022).*

* cited by examiner

SYSTEM AND METHOD TO VALIDATE A RENDERED OBJECT USING NON-FUNGIBLE TOKENS

TECHNICAL FIELD

The present disclosure relates generally to network communications and information security. More particularly, in certain embodiments, the present disclosure is related to a system and method for validating a rendered object using non-fungible tokens.

BACKGROUND

In a network environment, user devices are in data communication with other user devices that may be distributed anywhere in the world. These network environments allow data and information to be shared among these devices. Some of the technical challenges that occur when data is exchanged between devices are controlling data leakage, unauthorized access to data, and preventing malicious activities. Data storing user devices, such as computers, laptops, augmented reality devices, virtual reality devices, and smartphones, are vulnerable to attacks. This vulnerability poses several network security challenges. Existing systems are typically unable to detect a malicious attack until after the attack has occurred. For example, a bad actor may create a rendered object for interaction with one or more users within a virtual environment and proceed to gain access to account information of those users.

SUMMARY

The disclosed system provides several practical applications and technical advantages that overcome the previously discussed technical problems. The following disclosure provides a practical application of a server that is configured as an information security device for a virtual environment. The disclosed information security device provides practical applications that improve the information security of the virtual environment by authenticating a virtual resource to validate a rendered object. Authentication of the virtual resource occurs by analyzing a blockchain record. This process provides a technical advantage that increases information security because it inhibits a bad actor from gaining access to account information users through the rendered object in the virtual environment. This process may be employed to authenticate and validate the rendered object before allowing a user to perform an interaction with the rendered object within a virtual environment.

In an embodiment, an apparatus for validating a rendered object using non-fungible tokens comprises a memory and a processor. The memory is operable to store a blockchain record comprising a plurality of transfers for a blockchain. The processor is operably coupled to the memory and configured to determine one or more parameters associated with a rendered object in a virtual environment, wherein the one or more parameters associated with the rendered object are categorized as infrastructure resources, object parameters, or event parameters, wherein the rendered object is a visual display operable for engagement in an interaction within the virtual environment. The processor is further configured to generate a non-fungible token (NFT) for assignment to the rendered object based on the determined one or more parameters and to receive a request to establish an interaction session to conduct an interaction between a first avatar associated with a first user and the rendered object. The processor is further configured to receive a request to validate the generated NFT. To validate the generated NFT, the processor is configured to access the blockchain record to determine a transfer comprising information associated with the generated NFT, perform a search query based on hash information of the generated NFT, and to determine an account storing the generated NFT. The processor is further configured to conduct the interaction between the first avatar and the rendered object in response to validating the generated NFT.

The disclosed system may further be integrated into an additional practical application of improving underlying operations of computing systems tasked to initiate and conduct interaction sessions with one or more users. For example, the disclosed system may reduce processing, memory, and time resources of a user device for identifying and validating a given virtual resource for each potential interaction. A separate server may analyze a blockchain record to validate a rendered object and then may authorize an interaction session based on the validation.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
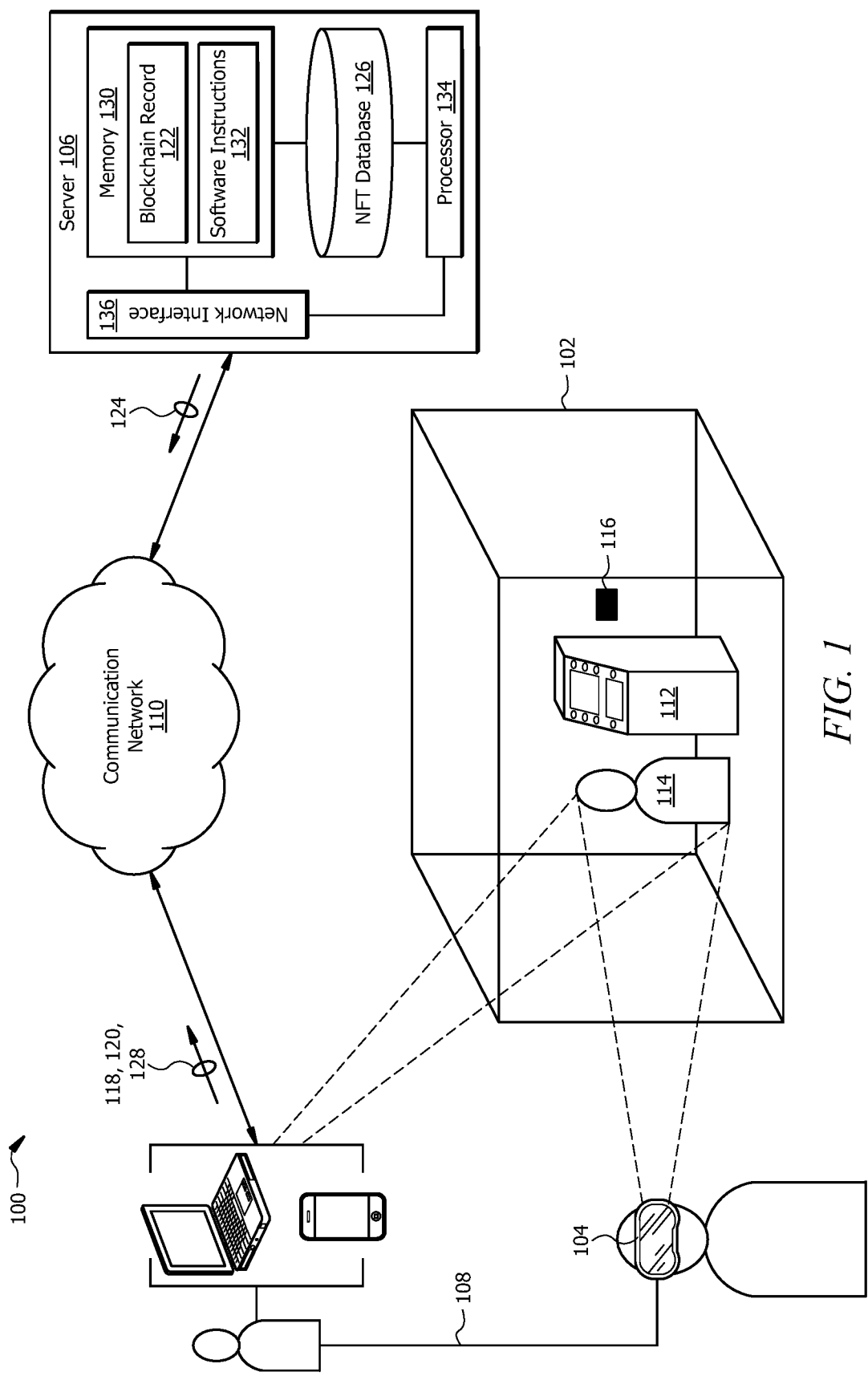
FIG. 1 is a schematic diagram of an example system for validating a rendered object using non-fungible tokens.
Figure 2:
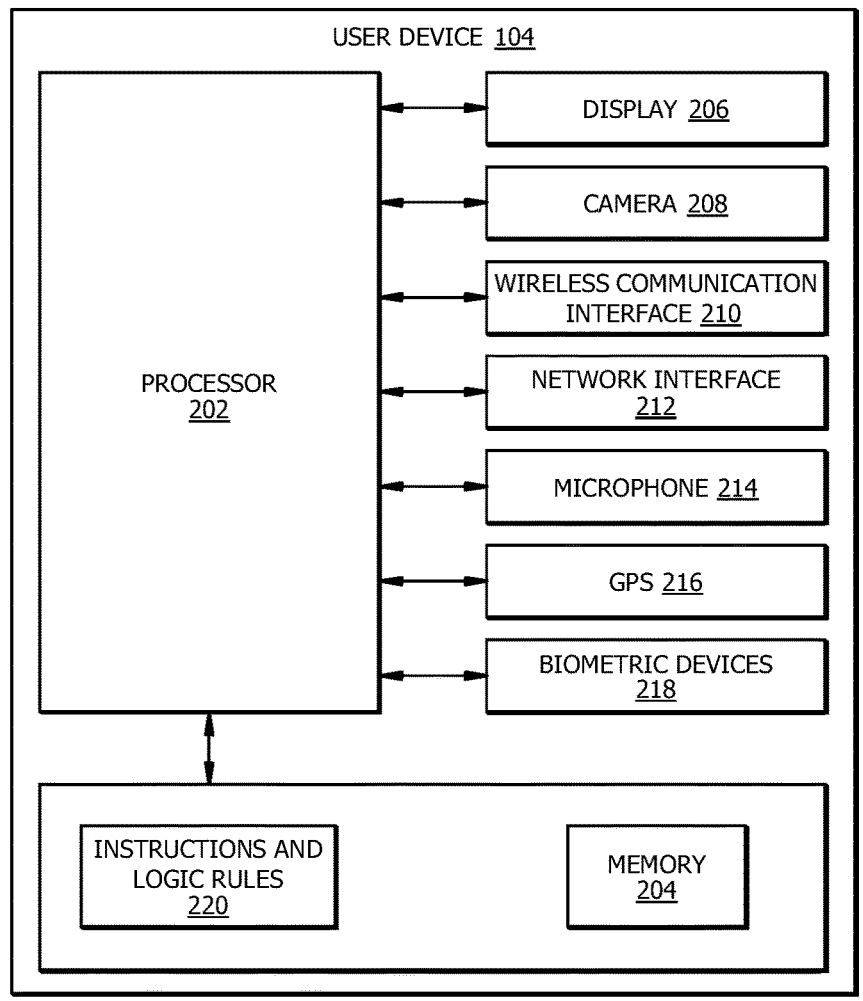
FIG. 2 is a block diagram of an example user device of the system of FIG. 1.
Figure 3:
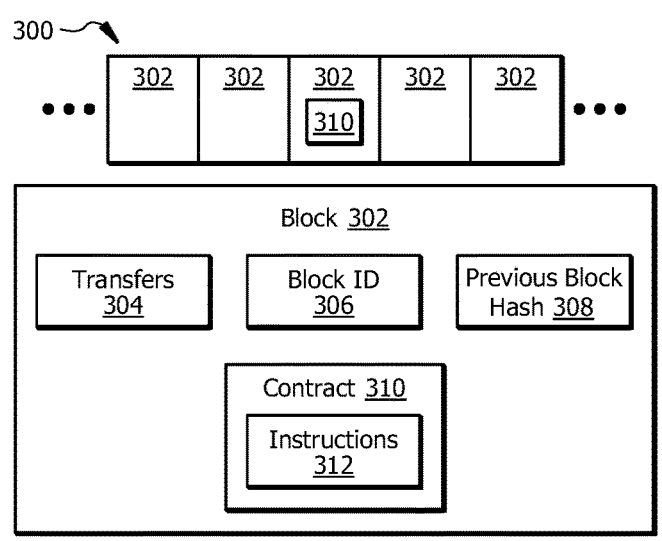
FIG. 3 is an embodiment of a blockchain of FIG. 1.
Figure 4:
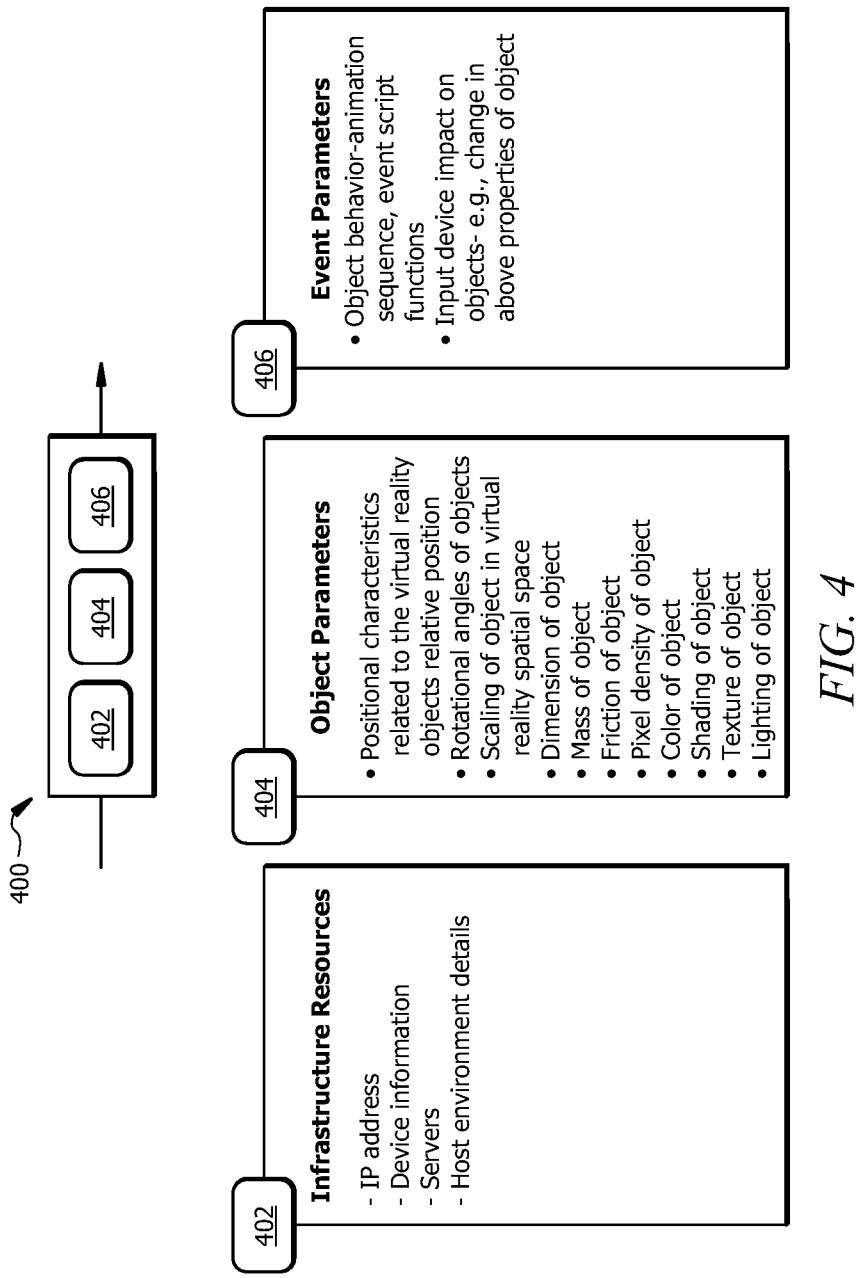
FIG. 4 is a block diagram of one or more non-fungible tokens of the system of FIG. 1.
Figure 5:
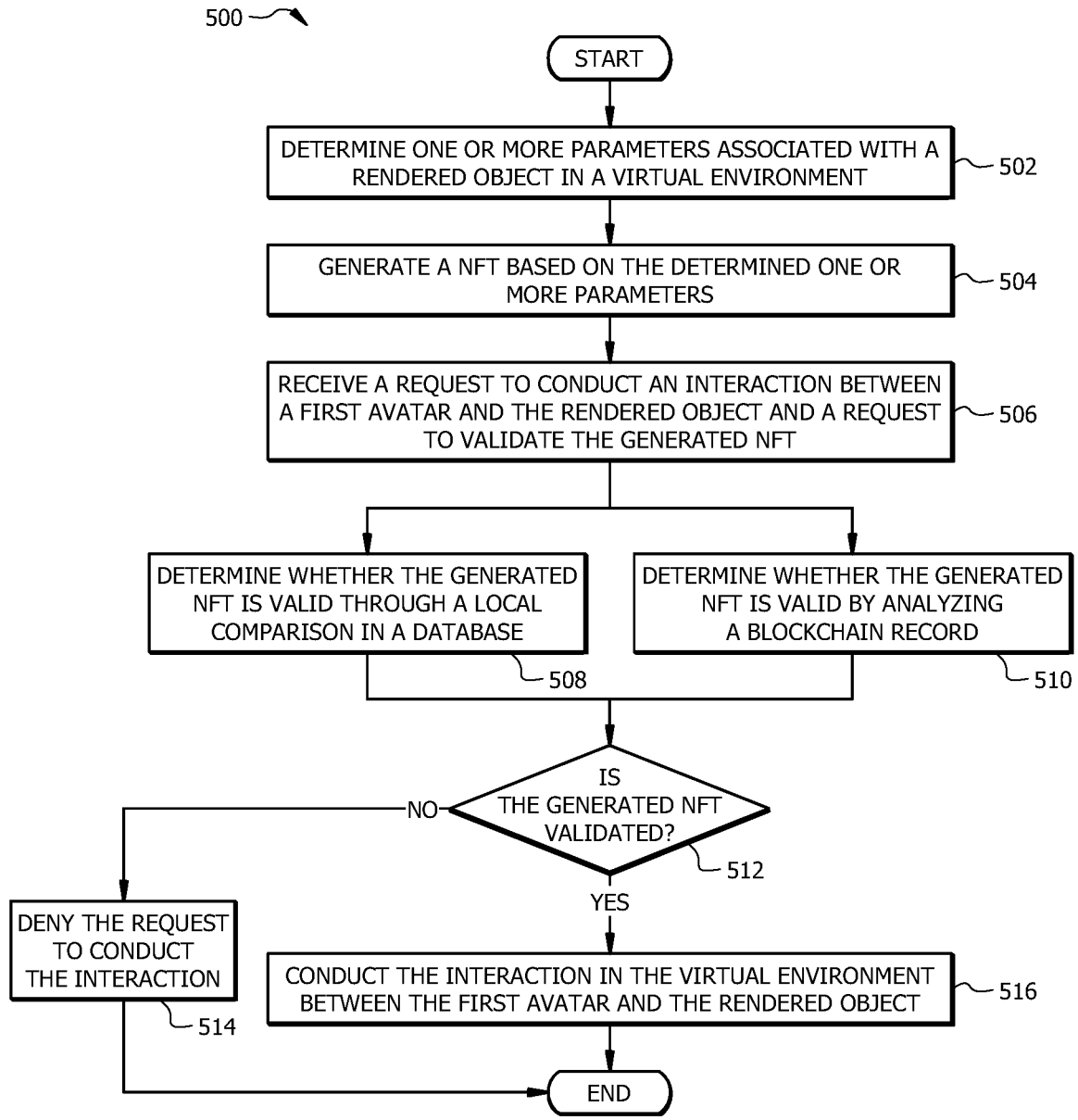
FIG. 5 is a flow diagram illustrating an example operation of the system of FIG. 1.

This disclosure provides solutions to the aforementioned and other problems of previous technology by validating a rendered object using non-fungible tokens for an interaction in a virtual environment. FIG. 1 is a schematic diagram of an example system for validating a rendered object using non-fungible tokens. FIG. 2 is a block diagram of an example user device of the system of FIG. 1. FIG. 3 is an embodiment of a blockchain record of FIG. 1. FIG. 4 is a block diagram of one or more non-fungible tokens of the system of FIG. 1. FIG. 5 is a flow diagram illustrating an example operation of the system of FIG. 1.

Example System for Validating a Rendered Object Using Non-Fungible Tokens

FIG. 1 illustrates a schematic diagram of an example system 100 that is generally configured to validate a rendered object using non-fungible tokens for an interaction in a virtual environment 102. The system 100 may include a first user device 104 and a server 106. A first user 108 is associated with the first user device 104. The system 100 may be communicatively coupled to a communication network 110 and may be operable to transmit data between the first user device 104 and the server 106 through the communication network 110. In general, the system 100 may improve electronic interaction technologies by validating a rendered object 112 prior to an interaction between the first user 108 and the rendered object 112 in the virtual environment 102. This process provides improved information security because it validates that the rendered object 112 is not associated with a fraudulent user or entity prior to authorizing an interaction between the rendered object 112 and a first avatar 114 that is associated with the first user 108 in the virtual environment 102.

For example, in a particular embodiment, a user (for example, the first user 108) may attempt to interact with the rendered object 112 in the virtual environment 102. The first user 108 may allow access to account information associated with the first user 108 during an interaction with the rendered object 112. The rendered object 112 may be a visual display created to depict any suitable object or structure within the virtual environment 102. The rendered object 112 may be created by any user or entity and may be associated with any user or entity. For example, the rendered object 112 may be a virtual kiosk created by and associated with a specific entity. In another example, the rendered object 112 may be associated with that entity but may be created by a third-party fraudulent user. In these examples, the first user 108 may not know the identity of who created the rendered object 112. Further, a user or entity may update or revise the rendered object 112 (for example, editing data to change the appearance of the virtual kiosk) or portions of the surrounding virtual environment 102 to commit fraud. The fraudulent user or entity may gain access to the account information associated with the first user 108 during the interaction with the rendered object 112.

The first user 108 may access the virtual environment 102 through the first user device 104. The first user device 104 is configured to display a two-dimensional (2D) or three-dimensional (3D) representation of the virtual environment 102 to the first user 108. Examples of a virtual environment 102 may include, but are not limited to, a graphical or virtual representation of a metaverse, a map, a building interior, a landscape, a fictional location, an alternate reality, or any other suitable type of location or environment. The virtual environment 102 may be configured to use realistic or non-realistic physics for the motion of objects within the virtual environment 102. For example, some virtual environments 102 may be configured to use gravity whereas other virtual environments 102 may not be configured to use gravity. Within the virtual environment 102, each user may be associated with an avatar (such as the first avatar 114 for the first user 108). An avatar is a graphical representation of the user at a virtual location within the virtual environment 102. Examples of an avatar may include, but are not limited to, a person, an animal, or an object. In some embodiments, the features and characteristics of the avatar may be customizable and user-defined. For example, the size, shape, color, attire, accessories, or any other suitable type of appearance features may be specified by a user. In embodiments, the virtual location of the avatar may be correlated to a physical location of a user in the real-world environment. By using an avatar, a user is able to move within the virtual environment 102 to interact with another avatar and objects (such as rendered object 112) within the virtual environment 102 while independently remaining at the physical location or being in transit in the real-world environment.

In embodiments, a virtual resource may be associated with the rendered object 112 in the virtual environment 102. Examples of virtual resources include, but are not limited to, virtual currency, non-fungible tokens (NFTs), virtual objects, virtual equipment, virtual vehicles, virtual property, images, documents, music files, video files, and text documents. As illustrated, a NFT 116 may be associated with the rendered object 112. The NFT 116 may be operable to facilitate verification of the rendered object 112. The NFT 116 may comprise data associated with the generation of the NFT 116, including, but not limited to, infrastructure parameters, object parameters, and event parameters. Without limitations, the infrastructure parameters may include an internet protocol (IP) address and device information of a device that generated the NFT 116, host environment data, server data, and the like. In embodiments, the object parameters may be physical parameters of the rendered object 112. For example, the object parameters may include positional characteristics related to the relative position of the rendered object 112, rotational angles of the rendered object 112, scaling of the rendered object 112 in a spatial space of the virtual environment 102, dimensions of the rendered object 112, mass of the rendered object 112, friction of the rendered object 112, pixel density of the rendered object 112, color(s) of the rendered object 112, shading of the rendered object 112, texture of the rendered object 112, lighting of the rendered object 112, and the like. In further embodiments, the event parameters may be visual changes of the rendered object 112. For example, the event parameters may include animation sequences, event script functions, user input based changes, and the like.

While engaging in the virtual environment 102 via the first avatar 114, the first user 108 may attempt to interact with the rendered object 112. For example, the first user 108 may attempt to engage in an interaction session with the rendered object 112 through the first avatar 114 to exchange virtual resources and/or real-world resources. Before the interaction between the first avatar 114 and rendered object 112 occurs, the server 106 may authenticate the rendered object 112 by validating the associated NFT 116. For example, any user may be capable of creating the rendered object 112, and the rendered object 112 may not be authentic. If an interaction were to occur between the first avatar 114 and the rendered object 112 without prior authorization by the server 106, a fraudulent user may gain access to account information of the first user 108.

In embodiments, the server 106 may receive a request 118 from the first user device 104 to establish an interaction session between the first avatar 114 and rendered object 112. The server 106 may further receive a request 120 from the first user device 104 to validate the NFT 116. To validate the NFT 116, the server 106 may access a blockchain record 122 that is configured to store a copy of a blockchain (such as blockchain 300 in FIG. 3). The blockchain is maintained across a distributed network comprising any suitable number of devices and comprises blocks (such as blocks 302 in FIG. 3) that contain every blockchain transfer executed in the network. Blockchain transfers may comprise information, files, or any other suitable type of data. For example, a transfer may comprise information associated with contracts, real-world resource transfers, virtual resource transfers, personal information, or any other type of information.

The server 106 may analyze one or more transfers stored in the blockchain associated with the NFT 116. The server 106 may perform a search query based on the hash information of the NFT 116 to produce search results associated with the NFT 116. In embodiments, the generation of the NFT 116 may be stored in the blockchain. Based on the search results, the server 106 may determine an account storing the NFT 116. The server 106 may transmit a signal 124 to the first user device 104 indicating whether or not the rendered object 112 is authentic based on the determined account. For example, if the determined account corresponds to a user or entity associated with the rendered object 112, the server 106 may proceed to establish the interaction session and conduct the interaction between the first user 108 and the rendered object 112. If the determined account does not correspond to a user or entity associated with the rendered object 112, the server 106 may deny the interaction session and indicate that the rendered object 112 is not authentic based on analyzing the NFT 116.

In one or more embodiments, the server 106 may have facilitated the generation of the NFT 116 and updated the blockchain record 122 to include the generation. In other embodiments, the server 106 may have received a signal from one or more devices communicatively coupled to the server 106 across the distributed network to update the blockchain record 122 to include the generation.

In embodiments wherein the server 106 generated the NFT 116, the server 106 may have additionally created the rendered object 112. Upon initially creating the rendered object 112 the server 106 may determine one or more parameters associated with the rendered object 112. The one or more parameters associated with the rendered object 112 are categorized as infrastructure resources, object parameters, or event parameters. The server 106 may then generate a NFT (such as NFT 116) for assignment to the rendered object 112 based on the determined one or more parameters. Depending on the one or more parameters determined by the server 106, the server 106 may generate a NFT container package (such as NFT container package 400 in FIG. 4) that comprises a plurality of individual NFTs, wherein the NFT container package may be assigned to the rendered object 112 to facilitate authentication instead of a singular NFT 116. The individual NFTs may be designated based on the one or more parameters and are discussed further in FIG. 4.

In an example, the server 106 may locally store the NFT 116 after generation and assignment to the rendered object 112. The NFT 116 may be stored in a NFT database 126. While the NFT database 126 is shown as a component of server 106, the NFT database 126 may be a separate component of system 100 external to server 100. The NFT database 126 may be accessible and communicatively coupled to the server 106 and one or more external, third-party servers. The external NFT database 126 may be a suitable server (e.g., including a physical server and/or virtual server) operable to store data/information in a memory and/or provide access to application(s) or other services.

In this example, the server 106 may receive a signal 128 from the first user device 104 comprising one or more parameters associated with the rendered object 112 that have been extracted by the first user device 104. The extracted one or more parameters may correlate to the one or more parameters used to generate the NFT 116. The server 106 may access the NFT database 126 storing the generated NFT 116 for comparison with the extracted one or more parameters. If the extracted one or more parameters match the one or more parameters used to generate the NFT 116, the server 106 may transmit the signal 124 to the first user device 104 indicating that the rendered object 112 is authentic and proceed with conducting the interaction.

The server 106 may further conduct the interaction between the first avatar 114 and rendered object 112 after authenticating the rendered object 112 through validating the NFT 116. The interaction may comprise exchange virtual resources and/or real-world resources. The server 106 is generally a suitable server (e.g., including a physical server and/or virtual server) operable to store data in a memory 130 and/or provide access to application(s) or other services. The server 106 may be a backend server associated with a particular group that facilitates conducting interactions between entities and one or more users. Details of the operations of the server 106 are described in conjunction with FIG. 5. Memory 130 includes software instructions 132 that, when executed by a processor 134, cause the server 106 to perform one or more functions described herein. Memory 130 may be volatile or non-volatile and may comprise a read-only memory (ROM), random-access memory (RAM), ternary content-addressable memory (TCAM), dynamic random-access memory (DRAM), and static random-access memory (SRAM). Memory 130 may be implemented using one or more disks, tape drives, solid-state drives, and/or the like. Memory 130 is operable to store software instructions 132, blockchain record 122, and/or any other data or instructions. The software instructions 132 may comprise any suitable set of instructions, logic, rules, or code operable to execute the processor 134. In these examples, the processor 134 may be communicatively coupled to the memory 130 and may access the memory 130 for these determinations.

Processor 134 comprises one or more processors operably coupled to the memory 130. The processor 134 is any electronic circuitry including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 134 can include any suitable data generation engine modules. The processor 134 may be a programmable logic device, a microcontroller, a microprocessor, or any suitable combination of the preceding. The one or more processors are configured to process data and may be implemented in hardware or software. For example, the processor 134 may be 8-bit, 16-bit, 32-bit, 64-bit, or of any other suitable architecture. The processor 134 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute software instructions 132. In this way, processor 134 may be a special-purpose computer designed to implement the functions disclosed herein. In an embodiment, the processor 134 is implemented using logic units, FPGAs, ASICs, DSPs, or any other suitable hardware. The processor 134 is configured to operate as described in FIGS. 1 and 5. For example, the processor 134 may be configured to perform the steps of method 500 as described in FIG. 5.

The processor 134 may be operable to identify the one or more parameters associated with the rendered object 112 for generating and validating the NFT 116. In embodiments, the processor 134 may utilize any suitable deep learning algorithm and/or protocols, machine learning algorithms, and the like. In certain embodiments, the processor 134 may implement a deep learning context module. For example, the deep learning context module may be implemented by a plurality of neural network layers, and the like. The deep learning context module may be configured to extract information (for example, the one or more parameters of the NFT 116) from an input. In certain embodiments, the deep learning context module may include an input layer (connected to) one or more hidden layers (connected to) an output layer. In certain embodiments, in each hidden layer, the neuron circuits (e.g., neuron logic gates) are connected to each other. The deep learning context module may be implemented by a supervised machine learning, semi-supervised machine learning, and/or unsupervised machine learning algorithm.

The processor 134 (e.g., via the deep learning context module) may parse an input and identify particular keywords that indicate the meaning of the input. For example, the deep learning context module may be pre-trained to identify particular keywords that indicate valid responses. In this process, the deep learning context module may perform word tokenization, sentence tokenization, word segmentation, sentence segmentation, word-tagging, sentence tagging, word sequences, sentiment analysis, and/or any other linguistic pattern analysis.

As illustrated, the server 106 may further comprise a network interface 136. Network interface 136 is configured to enable wired and/or wireless communications (e.g., via communication network 110). The network interface 136 is configured to communicate data between the server 106 and other devices (e.g., first user device 104, second user device 106, first entity device 108, second entity device 110, etc.), databases (e.g., external database 144), systems, or domain(s). For example, the network interface 136 may comprise a WIFI interface, a local area network (LAN) interface, a wide area network (WAN) interface, a modem, a switch, or a router. The processor 134 is configured to send and receive data using the network interface 136. The network interface 136 may be configured to use any suitable type of communication protocol as would be appreciated by one of skill in the art.

The communication network 110 may facilitate communication within the system 100. This disclosure contemplates the communication network 110 being any suitable network operable to facilitate communication between the first user device 104, second user device 106, first entity device 108, second entity device 110, and the server 106. Communication network 110 may include any interconnecting system capable of transmitting audio, video, signals, data, messages, or any combination of the preceding. Communication network 110 may include all or a portion of a local area network (LAN), a wide area network (WAN), an overlay network, a software-defined network (SDN), a virtual private network (VPN), a packet data network (e.g., the Internet), a mobile telephone network (e.g., cellular networks, such as 4G or 5G), a POT network, a wireless data network (e.g., WiFi, WiGig, WiMax, etc.), a Long Term Evolution (LTE) network, a Universal Mobile Telecommunications System (UMTS) network, a peer-to-peer (P2P) network, a Bluetooth network, a Near Field Communication network, a Zigbee network, and/or any other suitable network, operable to facilitate communication between the components of system 100. In other embodiments, system 100 may not have all of these components and/or may have other elements instead of, or in addition to, those above.

The first user device 104 may be any computing device configured to communicate with other devices, such as a server (e.g., server 106), databases, etc. through the communication network 110. The first user device 104 may be configured to perform specific functions described herein and interact with server 106, e.g., via its user interfaces. The first user device 104 is a hardware device that is generally configured to provide hardware and software resources to a user. Examples of a user device include, but are not limited to, a virtual reality device, an augmented reality device, a laptop, a computer, a smartphone, a tablet, a smart device, an Internet-of-Things (IoT) device, or any other suitable type of device. The user device may comprise a graphical user interface (e.g., a display), a touchscreen, a touchpad, keys, buttons, a mouse, or any other suitable type of hardware that allows a user to view data and/or to provide inputs into the user device. The first user device 104 may be configured to allow a user to send requests to the server 106 or to another user device.

Example User Device

FIG. 2 is a block diagram of an embodiment of the first user device 104 used by the system of FIG. 1. First user device 104 may be configured to display the virtual environment 102 (referring to FIG. 1) within a field of view of the first user 108 (referring to FIG. 1), capture biometric, sensory, and/or physical information of the first user 108 wearing the first user device 104, and to facilitate an electronic interaction between the first user 108 and the rendered object 112 (referring to FIG. 1). An example of the first user device 104 in operation is described in FIG. 5.

First user device 104 comprises a processor 202, a memory 204, and a display 206. Further embodiments may include a camera 208, a wireless communication interface 210, a network interface 212, a microphone 214, a global position system (GPS) sensor 216, and/or one or more biometric devices 218. First user device 104 may be configured as shown or in any other suitable configuration. For example, first user device 104 may comprise one or more additional components and/or one or more shown components may be omitted.

The processor 202 comprises one or more processors operably coupled to and in signal communication with memory 204, display 206, camera 208, wireless communication interface 210, network interface 212, microphone 214, GPS sensor 216, and biometric devices 218. Processor 202 is configured to receive and transmit electrical signals among one or more of memory 204, display 206, camera 208, wireless communication interface 210, network interface 212, microphone 214, GPS sensor 216, and biometric devices 218. The electrical signals are used to send and receive data (e.g., images captured from camera 208, virtual objects to display on display 206, etc.) and/or to control or communicate with other devices. Processor 202 may be operably coupled to one or more other devices (for example, the server 106 in FIG. 1). Similar to processor 134 (referring to FIG. 1), the processor 202 may be operable to identify one or more parameters associated with the rendered object 112 (referring to FIG. 1). In embodiments, the processor 202 may utilize any suitable deep learning algorithm and/or protocols, machine learning algorithms, and the like.

The processor 202 is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 202 may be a programmable logic device, a microcontroller, a microprocessor, or any suitable combination of the preceding. The one or more processors are configured to process data and may be implemented in hardware or software. For example, the processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement the function disclosed herein, such as some or all of those described with respect to FIGS. 1 and 5. For example, processor 202 may be configured to display virtual objects on display 206, detect hand gestures, identify virtual objects selected by a detected hand gesture (e.g., identify selected files), capture biometric information of a user, such as first user 108, via one or more of camera 208, microphone 214, and/or biometric devices 218, and communicate via wireless communication interface 210 with server 106. In some embodiments, the function described herein is implemented using logic units, FPGAs, ASICs, DSPs, or any other suitable hardware or electronic circuitry.

The memory 204 is operable to store any of the information described with respect to FIGS. 1 and 5 along with any other data, instructions, logic, rules, or code operable to implement the function(s) described herein when executed by processor 202. For example, the memory 204 may store the instructions and logic rules 220, which are described below with respect to FIG. 5. The memory 204 comprises one or more disks, tape drives, or solid-state drives, and may be used as an over-flow data storage device, to store programs when such programs are selected for execution, and to store instructions and data that are read during program execution. Memory 204 is operable to store, for example, instructions for performing the functions of first user device 104 described herein, and any other data or instructions. The memory 204 may be volatile or non-volatile and may comprise read-only memory (ROM), random-access memory (RAM), ternary content-addressable memory (TCAM), dynamic random-access memory (DRAM), and static random-access memory (SRAM).

Display 206 is configured to present visual information to a user (for example, first user 108 in FIG. 1) in an augmented reality environment that overlays virtual or graphical objects onto tangible objects in a real scene in real-time. In other embodiments, the display 206 is configured to present visual information to the user as the virtual environment 102 (referring to FIG. 1) in real-time. In an embodiment, display 206 is a wearable optical display (e.g., glasses or a headset) configured to reflect projected images and enables a user to see through the display. For example, display 206 may comprise display units, lens, semi-transparent mirrors embedded in an eye glass structure, a visor structure, or a helmet structure. Examples of display units include, but are not limited to, a cathode ray tube (CRT) display, a liquid crystal display (LCD), a liquid crystal on silicon (LCOS) display, a light emitting diode (LED) display, an active matrix OLED (AMOLED), an organic LED (OLED) display, a projector display, or any other suitable type of display as would be appreciated by one of ordinary skill in the art upon viewing this disclosure. In another embodiment, display 206 is a graphical display on a user device. For example, the graphical display may be the display of a tablet or smart phone configured to display an augmented reality environment with virtual or graphical objects onto tangible objects in a real scene in real-time and/or virtual environment 102.

Examples of camera 208 include, but are not limited to, charge-coupled device (CCD) cameras and complementary metal-oxide semiconductor (CMOS) cameras. Camera 208 is configured to capture images of a wearer of first user device 104, such as first user 108. Camera 208 may be configured to capture images continuously, at predetermined intervals, or on-demand. For example, camera 208 may be configured to receive a command from first user 108 to capture an image. In another example, camera 208 is configured to continuously capture images to form a video stream. Camera 208 is communicably coupled to processor 202.

Examples of wireless communication interface 210 include, but are not limited to, a Bluetooth interface, an RFID interface, a near field communication interface, a local area network (LAN) interface, a personal area network interface, a wide area network (WAN) interface, a Wi-Fi interface, a ZigBee interface, or any other suitable wireless communication interface as would be appreciated by one of ordinary skill in the art upon viewing this disclosure. Wireless communication interface 210 is configured to facilitate processor 202 in communicating with other devices. For example, wireless communication interface 210 is configured to enable processor 202 to send and receive signals with other devices, such as server 106 (referring to FIG. 1). Wireless communication interface 210 is configured to employ any suitable communication protocol.

The network interface 212 is configured to enable wired and/or wireless communications. The network interface 212 is configured to communicate data between the first user device 104 and other network devices, systems, or domain(s). For example, the network interface 212 may comprise a WIFI interface, a local area network (LAN) interface, a wide area network (WAN) interface, a modem, a switch, or a router. The processor 202 is configured to send and receive data using the network interface 212. The network interface 212 may be configured to use any suitable type of communication protocol as would be appreciated by one of ordinary skill in the art.

Microphone 214 is configured to capture audio signals (e.g., voice signals or commands) from a user, such as first user 108. Microphone 214 is configured to capture audio signals continuously, at predetermined intervals, or on-demand. Microphone 214 is communicably coupled to processor 202.

GPS sensor 216 is configured to capture and to provide geographical location information. For example, GPS sensor 216 is configured to provide a geographic location of a user, such as first user 108, employing first user device 104. GPS sensor 216 may be configured to provide the geographic location information as a relative geographic location or an absolute geographic location. GPS sensor 216 may provide the geographic location information using geographic coordinates (i.e., longitude and latitude) or any other suitable coordinate system. GPS sensor 216 is communicably coupled to processor 202.

Examples of biometric devices 218 may include, but are not limited to, retina scanners and fingerprint scanners. Biometric devices 218 are configured to capture information about a person's physical characteristics and to output a biometric signal based on captured information. A biometric signal is a signal that is uniquely linked to a person based on their physical characteristics. For example, biometric device 218 may be configured to perform a retinal scan of the user's eye and to generate a biometric signal for the user based on the retinal scan. As another example, a biometric device 218 is configured to perform a fingerprint scan of the user's finger and to generate a biometric signal for the user based on the fingerprint scan. Biometric device 218 is communicably coupled to processor 202.

Example Block of the Blockchain Record

FIG. 3 illustrates an embodiment of a blockchain 300 from the blockchain record 122 of FIG. 1. The blockchain 300 links together blocks 302 of data which comprise identifiable units called transfers 304. Transfers 304 may comprise information, files, or any other suitable type of data. For example, a transfer 304 may comprise information associated with contracts, real-world resource transfers, virtual resource transfers, personal information, or any other type of information.

Each block 302 in the blockchain 300 comprises a block identifier 306 and information derived from a preceding block 302. For example, every block 302 in the blockchain 300 includes a hash 308 of the previous block 302. By including the hash 308, the blockchain 300 comprises a chain of blocks 302 from a genesis block 302 to the current block 302. Each block 302 is guaranteed to come after the previous block 302 chronologically because the previous block's hash 308 would otherwise not be known. In one embodiment, blocks 302 in a blockchain 300 may be linked together by identifying a preceding block 302 with a cryptographic checksum (e.g., secure hash algorithm (SHA)-256) of its contents (e.g., the transfer and additional metadata) which serves as each block's unique identifier. Links are formed by storing the cryptographic checksum identifier of one block 302 in the metadata of another block 302, such that the former block 302 becomes the predecessor of the latter block 302. In this way, the blocks 302 form a chain that can be navigated from block-to-block by retrieving the cryptographic checksum of a particular block's predecessor from the particular block's own metadata. Each block 302 is computationally impractical to modify once it has been in the blockchain because every block 302 after it would also have to be regenerated. These features protect data stored in the blockchain 300 from being modified by bad actors which provides information security. When a network node creates an entry (e.g., one or more transfers 304 in a block 302) in its blockchain record 122, the blockchain 300 for all other network nodes in the distributed network is also updated with the new entry. Thus, data entered in a blockchain 300 is available and accessible to every network node with a copy of the blockchain record 122. This allows the data stored in the block 302 to be accessible for inspection and verification at any time by any device with a copy of the blockchain record 122.

Some blocks 302 comprise one or more contracts 310. The contracts 310 comprise machine-executable code, script, or instructions 312 that are configured to execute when a set of predetermined conditions have been satisfied. The contract 310 is configured to receive messages or information from other devices (e.g., first user device 104 or server 106) and to use the conditions as logical tests to determine whether or not to execute a set of instructions 312. The contract 310, instructions 312, and conditions may be written C++, C#, Go, Python, Java, extensible markup language (XML) script, or any other suitable programming language. The instructions 312 may be configured with instructions for performing any specified operations. For example, the instructions 312 may be configured to facilitate a real-world resource transfer and/or a virtual resource transfer between users. In one embodiment, the instructions 312 comprise instructions for entering a transfer in the blockchain 300 for transferring real-world resources and/or virtual resources between users' digital folders. In other embodiments, the instructions 312 may comprise any other suitable type and combination of machine-executable instructions for performing other types of operations. The conditions may be configured as Boolean tests for determining whether a condition has been satisfied. Examples of conditions include, but are not limited to, range threshold values, valid time periods, approved product and service types, approved locations or areas, or any other suitable type of condition.

In embodiments, the server 106 may generate the NFT 116 associated with the rendered object 112. In this case, the server 106 may send instructions or commands to one or more contracts 310 in the blockchain record 122 to execute the one or more contracts 310 to perform a generation of the NFT 116 and an assignment to the rendered object 112.

Example NFT Container Package

FIG. 3 illustrates an embodiment of a NFT container package 400 for the system 100 of FIG. 1. The NFT container package 400 may comprise a plurality of NFTs. As illustrated, the NFT container package 400 may comprise a first NFT 402, a second NFT 404, and a third NFT 406, wherein each is packaged within the NFT container package 400 to collectively be processed as a singular object structure. Each of the first NFT 402, second NFT 404, and third NFT 406 may include one or more parameters associated with the rendered object 112 (referring to FIG. 1). For example, the first NFT 402 may comprise the one or more parameters categorized as infrastructure resources, the second NFT 404 may comprise the one or more parameters categorized as object parameters, and the third NFT 406 may comprise the one or more parameters categorized as event parameters. In embodiments, the NFT container package 400 may be assigned to the rendered object 112 in place of the generated NFT 116 (referring to FIG. 1), and the server 106 (referring to FIG. 1) may be operable to validate the NFT container package 400. Validating the NFT container package 400 may comprise of validating each of the first NFT 402, second NFT 404, and third NFT 406 within the NFT container package 400.

To validate the first NFT 402, the server 102 may receive a request from the first user device 104 (referring to FIG. 1) to provide the one or more parameters associated with infrastructure resources for validating the first NFT 402 of the generated NFT container package 400. For example, the first user device 104 may not have access to parameters such as an internet protocol (IP) address and device information of a device that generated the first NFT 402, host environment data, server data, and the like. In embodiments, the server 106 may have generated the first NFT 402 and may provide those parameters to the first user device 104.

In an embodiment, there may be an update to the rendered object 112 or to a surrounding portion of the virtual environment 102 (referring to FIG. 1) affecting the rendered object 112. The server 106 may generate a newer version of any one of the first NFT 402, second NFT 404, or third NFT 406 containing one or more parameters affected by the update. For example, an object parameter, such as the color of the rendered object 112 may be updated. In this example, the server 106 may generate a new second NFT 404 and create a NFT container package 400 that comprises the new second NFT 404. The server 106 may update the blockchain 300 (referring to FIG. 3) to reflect the created NFT container package comprising the new second NFT 404, wherein any future authentication attempts for the rendered object 112 may utilize the NFT container package 400 comprising the new second NFT 404.

Example Operation of the System for Authenticating Digital Assets

FIG. 5 is a flow diagram illustrating an example method 500 of the system 100 of FIG. 1. The method 500 may be implemented using the first user device 104 and the server 106 of FIG. 1. The method 500 may begin at step 502 where the server 106 may create a rendered object 112 (referring to FIG. 1) in the virtual environment 102 (referring to FIG. 1). For example, the server 106 may be associated with an entity and may create a rendered object 112, such as a virtual kiosk, to facilitate interactions within the virtual environment 102 with one or more users. The processor 134 (referring to FIG. 1) of the server 106 may determine one or more parameters associated with the rendered object 112. In embodiments, the processor 134 may utilize any suitable deep learning algorithm and/or protocols, machine learning algorithms, and the like to determine the one or more parameters.

At step 504, the processor 134 of the server 106 may generate at least one NFT 116 (referring to FIG. 1) based on the determined one or more parameters from step 502. The at least one generated NFT 116 may comprise data associated with the rendered object 112 and may be assigned to the rendered object 112. In another example, the processor 134 may generate the NFT container package 400 (referring to FIG. 4) comprising individual NFTs categorized by the one or more parameters contained therein. In this example, the NFTs may be separated based on whether the one or more parameters are categorized as infrastructure resources, object parameters, or event parameters. The processor 134 of the server 106 may update the blockchain record 122 indicating generation of the at least one NFT 116 or NFT container package 400. In embodiments, there may be an update to the rendered object 112 or to a surrounding portion of the virtual environment 102 affecting the rendered object 112. The processor 134 of the server 106 may generate a newer version of the NFT 116 containing one or more parameters affected by the update. For example, an object parameter, such as the color of the rendered object 112 may be updated from red to blue. The server 106 may update the blockchain 300 (referring to FIG. 3) to reflect the new NFT 116, and future authentication attempts for the rendered object 112 through method 500 may utilize the new NFT 116.

At step 506, the first user 108 (referring to FIG. 1) may request to establish an interaction session to conduct an interaction between the first avatar 114 (referring to FIG. 1) and the rendered object 112 in the virtual environment 102. In embodiments, the first user device 104 may transmit the request 118 (referring to FIG. 1) to the server 106 to establish the interaction session. Before the interaction between the first avatar 114 and the rendered object 112 occurs, the server 106 may authenticate the rendered object 112. For example, any suitable user may be capable of creating the rendered object 112, and the rendered object may not be authentic. If an interaction were to occur between the first avatar 114 and the rendered object without prior authorization by the server 106, a fraudulent user may gain access to account information associated with the first user 108. In embodiments, the rendered object 112 may be authenticated by validating generation of the NFT 116 (or NFT container package 400). The first user device 104 may further transmit the request 120 (referring to FIG. 1) to the server 106 to validate the NFT 116, or NFT container package 400, associated with the rendered object 112. The method 500 may proceed to either step 508 or step 510.

At step 508, in response to the processor 134 of the server 106 receiving the requests 118, 120, the processor 134 may receive signal 128 (referring to FIG. 1) from the first user device 104 comprising one or more parameters associated with the rendered object 112 that have been extracted by the first user device 104. The extracted one or more parameters may correlate to the one or more parameters used to generate the NFT 116 by server 106. The processor 134 of the server 106 may access the NFT database 126 (referring to FIG. 1) storing the generated NFT 116 for comparison with the extracted one or more parameters. If the extracted one or more parameters match the one or more parameters used to generate the NFT 116, the processor 134 of the server 106 may transmit the signal 124 (referring to FIG. 1) to the first user device 104 indicating that the rendered object 112 is authentic and proceed with method 500.

At step 510, in response to the processor 134 of the server 106 receiving the requests 118, 120, the processor 134 may access the memory 130 (referring to FIG. 1) to search the blockchain record 122 (referring to FIG. 1). The processor 134 of the server 106 may analyze one or more transfers 304 (referring to FIG. 3) stored in the blockchain 300 associated with the NFT 116. The processor 134 of the server 106 may perform a search query based on hash information of the NFT 116 to produce search results associated with the NFT 116. In embodiments, the generation of the NFT 116 may be stored in the blockchain 300. Based on the search results, the server processor 134 of the server 106 may determine an account storing the NFT 116. The processor 134 of the server 106 may transmit signal 124 to the first user device 104 indicating whether or not the rendered object 112 is authentic based on the determined account. For example, if the determined account corresponds to a user or entity associated with the rendered object 112, the processor 134 of the server 106 may proceed with the method 500 to establish the interaction session. If the determined account does not correspond to a user or entity associated with the rendered object 112, the processor 134 of the server 106 may indicate that the rendered object 112 is not authentic based on analyzing the NFT 116.

At step 512, the processor 134 may determine whether the NFT 116 has been validated for authentication of the rendered object 112. If the processor 134 determines that the NFT 116 is not validated, the method 500 proceeds to step 514. Otherwise, the method 500 proceeds to step 516. At step 514, the processor 134 of the server 106 may deny the request to establish an interaction session between the first avatar 114 and the rendered object 112. Then, the method 500 proceeds to end.

At step 516, the processor 134 of the server 106 may establish the interaction session between the first avatar 114 and the rendered object 112 in order to conduct the interaction between the first user 108 and the rendered object 112. The processor 134 of the server 106 may then conduct the interaction, wherein the interaction comprises exchanging virtual resources and/or real-world resources. Then, the method 500 proceeds to end.

While several embodiments have been provided in the present disclosure, it should be understood that the disclosed systems and methods might be embodied in many other specific forms without departing from the spirit or scope of the present disclosure. The present examples are to be considered as illustrative and not limiting, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 106(f) as it exists on the date of filing hereof unless the words "means for" or "step for" are explicitly used in the particular claim.

The invention claimed is:

1. An apparatus for validating a rendered object using non-fungible tokens, comprising:
a memory operable to:
store a blockchain record comprising a plurality of transfers for a blockchain; and
a processor, operably coupled to the memory, configured to:
determine one or more parameters associated with a rendered object in a virtual environment, wherein:
the one or more parameters associated with the rendered object are categorized as infrastructure resources, object parameters, or event parameters;
the rendered object is a visual display operable for engagement in one or more interactions within the virtual environment; and
the one or more interactions comprise at least one exchange of one or more virtual resources or one or more physical resources;
generate a non-fungible token (NFT) for assignment to the rendered object based on the determined one or more parameters;
receive a request to establish an interaction session to conduct an interaction between a first avatar associated with a first user and the rendered object;
in response to receiving the request, receive a request to validate the generated NFT, wherein validating the generated NFT comprises:
accessing the blockchain record to determine a transfer comprising information associated with the generated NFT;
performing a search query based on hash information of the generated NFT to produce a plurality of search results associated with the generated NFT, the plurality of search results referencing one or more accounts;
determining whether a first search result of the plurality of search results is associated with the generated NFT;
in response to determining that the first search result of the plurality of search results is associated with the generated NFT, determining an account referenced by the first search result as being associated with the generated NFT; and
in response to determining the account referenced by the first search result as being associated with the generated NFT, determining that the rendered object is authentic; and
in response to determining that the rendered object is authentic, establish the interaction session to conduct the interaction between the first avatar and the rendered object in the virtual environment.

2. The apparatus of claim 1, wherein the memory is further configured to:
update the blockchain record to indicate that the generated NFT is assigned to the rendered object.

3. The apparatus of claim 1, wherein the processor is further configured to:
transmit a signal to a first user device associated with the first user indicating whether or not the generated NFT is valid based on the determined account.

4. The apparatus of claim 3, wherein the processor is further configured to:
deny the interaction session if the generated NFT is not validated.

5. The apparatus of claim 1, wherein the processor is further configured to:
receive a signal from a first user device associated with the first user comprising extracted one or more parameters associated with the rendered object; and
access a NFT database storing the generated NFT for comparison with the extracted one or more parameters.

6. The apparatus of claim 1, wherein the processor is further configured to:
generate a NFT container package for assignment to the rendered object, wherein the NFT container package comprises a first NFT generated based on one or more parameters associated with infrastructure resources, a second NFT generated based on one or more parameters associated with object parameters, and a third NFT generated based on one or more parameters associated with event parameters.

7. The apparatus of claim 6, wherein the processor is further configured to:
receive a request from a first user device associated with the first user to provide the one or more parameters associated with infrastructure resources for validating the first NFT of the generated NFT container package.

8. A method for validating a rendered object using non-fungible tokens, comprising:
determining one or more parameters associated with a rendered object in a virtual environment, wherein:
the one or more parameters associated with the rendered object are categorized as infrastructure resources, object parameters, or event parameters; and
the rendered object is a visual display operable for engagement in one or more interactions within the virtual environment;
generating a non-fungible token (NFT) for assignment to the rendered object based on the determined one or more parameters;
receiving a request to establish an interaction session to conduct an interaction between a first avatar associated with a first user and the rendered object;
in response to receiving the request, receiving a request to validate the generated NFT, wherein validating the generated NFT comprises:
accessing a blockchain record to determine a transfer comprising information associated with the generated NFT;
performing a search query based on hash information of the generated NFT to produce a plurality of search results associated with the generated NFT, the plurality of search results referencing one or more accounts;
determining whether a first search result of the plurality of search results is associated with the generated NFT;
in response to determining that the first search result of the plurality of search results is associated with the generated NFT, determining an account referenced by the first search result as being associated with the generated NFT; and in response to determining the account referenced by the first search result as being associated with the generated NFT, determining that the rendered object is authentic; and in response to determining that the rendered object is authentic, establishing the interaction session to conduct the interaction between the first avatar and the rendered object in the virtual environment.

9. The method of claim 8, further comprising updating the blockchain record to indicate that the generated NFT is assigned to the rendered object.

10. The method of claim 8, further comprising transmitting a signal to a first user device associated with the first user indicating whether or not the generated NFT is valid based on the determined account.

11. The method of claim 10, further comprising denying the interaction session if the generated NFT is not validated.

12. The method of claim 8, further comprising:
receiving a signal from a first user device associated with the first user comprising extracted one or more parameters associated with the rendered object; and
accessing a NFT database storing the generated NFT for comparison with the extracted one or more parameters.

13. The method of claim 8, further comprising:
generating a NFT container package for assignment to the rendered object, wherein the NFT container package comprises a first NFT generated based on one or more parameters associated with infrastructure resources, a second NFT generated based on one or more parameters associated with object parameters, and a third NFT generated based on one or more parameters associated with event parameters.

14. The method of claim 13, further comprising receiving a request from a first user device associated with the first user to provide the one or more parameters associated with infrastructure resources for validating the first NFT of the generated NFT container package.

15. A non-transitory computer-readable medium storing instructions that, when executed by a processor, cause the processor to:
determine one or more parameters associated with a rendered object in a virtual environment, wherein:
the one or more parameters associated with the rendered object are categorized as infrastructure resources, object parameters, or event parameters; and
the rendered object is a visual display operable for engagement in one or more interactions within the virtual environment;
generate a non-fungible token (NFT) for assignment to the rendered object based on the determined one or more parameters;
receive a request to establish an interaction session to conduct an interaction between a first avatar associated with a first user and the rendered object;
in response to receiving the request, receive a request to validate the generated NFT, wherein validating the generated NFT comprises:

accessing a blockchain record to determine a transfer comprising information associated with the generated NFT;
performing a search query based on hash information of the generated NFT to produce a plurality of search results associated with the generated NFT, the plurality of search results referencing one or more accounts;
determining whether a first search result of the plurality of search results is associated with the generated NFT;
in response to determining that the first search result of the plurality of search results is associated with the generated NFT, determining an account referenced by the first search result as being associated with the generated NFT; and
in response to determining the referenced by the first search result as being associated with storing the generated NFT, determining that the rendered object is authentic; and
in response to determining that the rendered object is authentic, establish the interaction session to conduct the interaction between the first avatar and the rendered object in the virtual environment.

16. The non-transitory computer-readable medium of claim 15, wherein the instructions further cause the processor to:
instruct a memory to update the blockchain record to indicate that the generated NFT is assigned to the rendered object.

17. The non-transitory computer-readable medium of claim 15, wherein the instructions further cause the processor to:
transmit a signal to a first user device associated with the first user indicating whether or not the generated NFT is valid based on the determined account.

18. The non-transitory computer-readable medium of claim 15, wherein the instructions further cause the processor to:
generate a NFT container package for assignment to the rendered object, wherein the NFT container package comprises a first NFT generated based on one or more parameters associated with infrastructure resources, a second NFT generated based on one or more parameters associated with object parameters, and a third NFT generated based on one or more parameters associated with event parameters.

19. The non-transitory computer-readable medium of claim 18, wherein the instructions further cause the processor to:
receive a request from a first user device associated with the first user to provide the one or more parameters associated with infrastructure resources for validating the first NFT of the generated NFT container package.

20. The non-transitory computer-readable medium of claim 15, wherein the instructions further cause the processor to:
receive a signal from a first user device associated with the first user comprising extracted one or more parameters associated with the rendered object; and
access a NFT database storing the generated NFT for comparison with the extracted one or more parameters.

* * * * *